2 Sheets—Sheet 1.

A. LEVAKE & S. N. GRUBB.
Waste-Pipe Cut-Off and Valve.

No. 211,917. Patented Feb. 4, 1879.

Witnesses
Geo. H. Strong.
Frank A. Brooks.

Inventor
Anson Levake and
Samuel N. Grubb
by Dewey & Co.
Attys

A. LEVAKE & S. N. GRUBB.
Waste-Pipe Cut-Off and Valve.
No. 211,917. Patented Feb. 4, 1879.
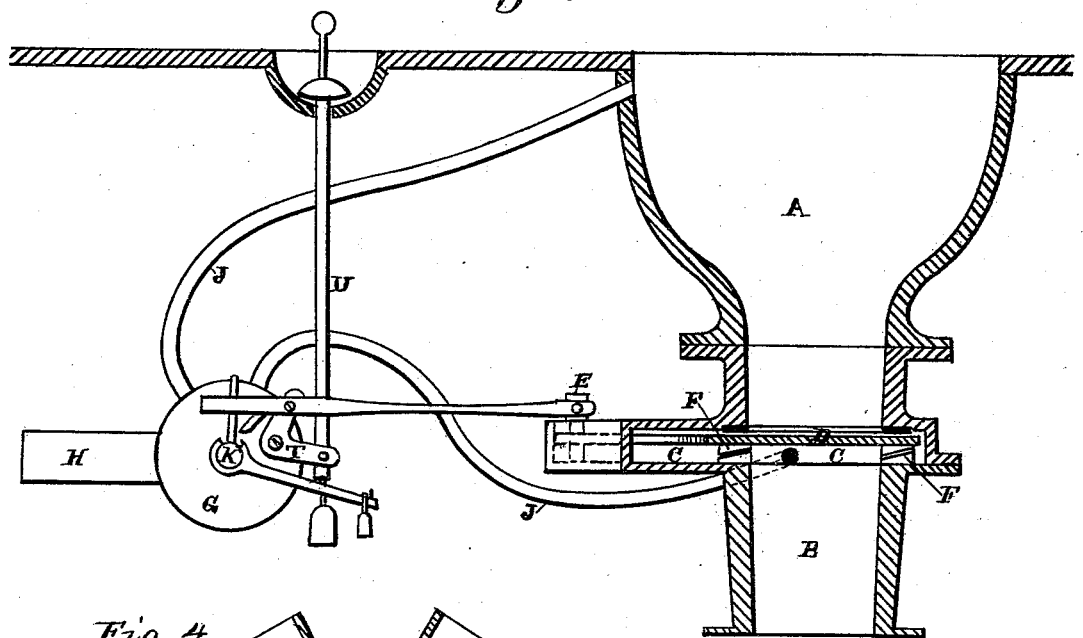
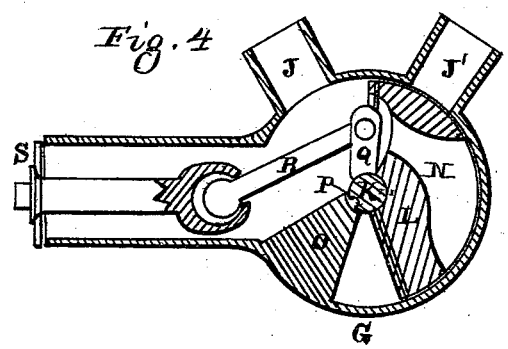
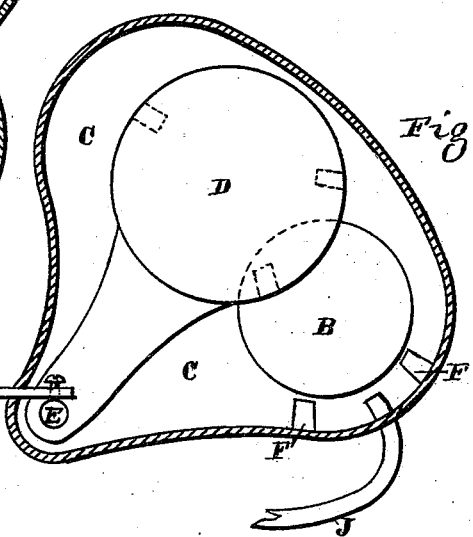
Witnesses
Geo. H. Strong.
Frank A. Brooks
Inventor
Anson Levake and
Samuel N. Grubb
by Dewey & Co.
Attys.

UNITED STATES PATENT OFFICE.

ANSON LEVAKE AND SAMUEL N. GRUBB, OF SAN FRANCISCO, CALIFORNIA.

IMPROVEMENT IN WASTE-PIPE CUT-OFF AND VALVE.

Specification forming part of Letters Patent No. 211,917, dated February 4, 1879; application filed May 16, 1878.

*To all whom it may concern:*

Be it known that we, ANSON LEVAKE and SAMUEL N. GRUBB, of the city and county of San Francisco, and State of California, have invented an Improved Waste-Pipe Cut-Off and Valve; and we do hereby declare the following to be a full, clear, and exact description thereof, reference being had to the accompanying drawings.

Our invention relates to an improved waste-pipe cut-off and valve, which is more particularly intended for use in water-closets.

It consists in forming a chamber between the waste-pipe and bowl, in which is a float swinging valve, operated by a bell-crank lever attached to the usual handle. This cut-off, just before it comes to its seat, rises on inclined supports under it, and is thus forced closely to its seat, entirely closing the passage between the bowl and waste-pipe. When drawn back horizontally it leaves the whole diameter of the waste-pipe free and open. The valve used in connection with this cut-off has one supply and two discharge pipes, and has a rotary motion imparted to it by a shaft connected with the usual handle. This shaft also operates simultaneously the primary inlet-valve in the supply-pipe. The arrangement is such that as the handle is raised and the cut-off valve in the bowl is removed from the opening over the waste-pipe one of the discharge-pipes throws a flat stream of water across the opening and prevents any gas or odor from rising. At a certain point the rotary valve closes this discharge-pipe and opens the other, so that a stream is directed into the upper part of the bowl. The water-valves close more slowly than they open by means of a peculiar arrangement, and thus allow a quantity of water always to remain in the bowl. Any leakage which may occur through the primary inlet-valve will always be conveyed off through the discharge-pipe under the cut-off valve and over the waste-pipe, thus allowing us to dispense with the overflow-pipe heretofore necessary.

Figure 1:
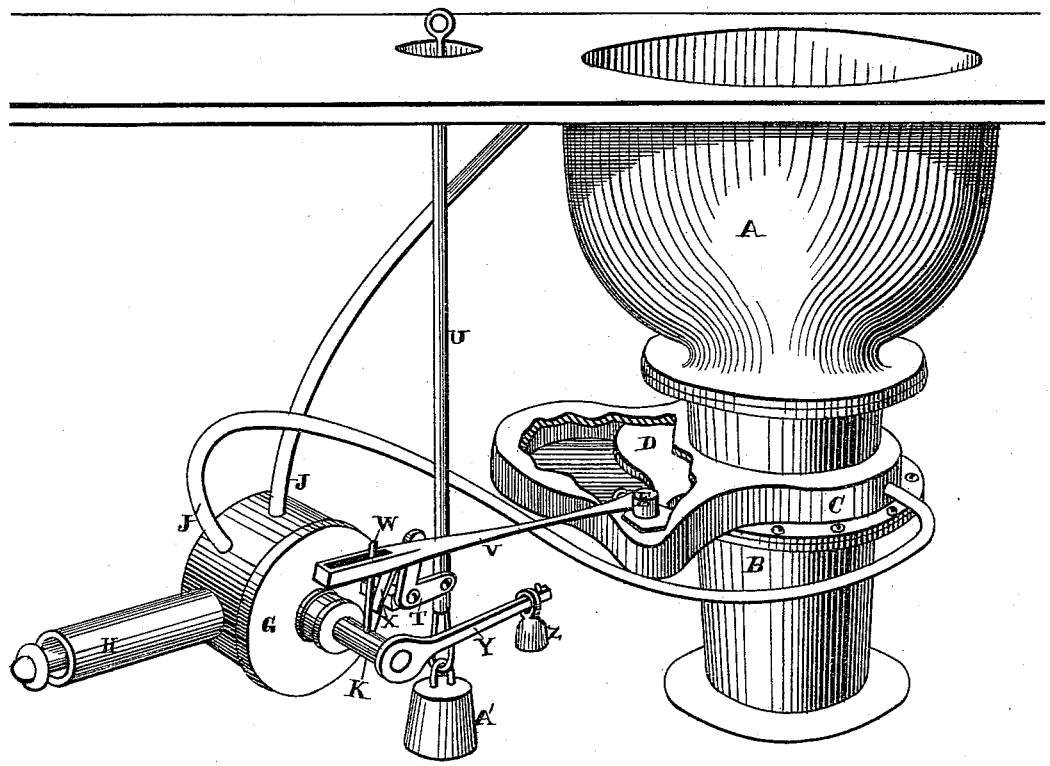
Figure 2:
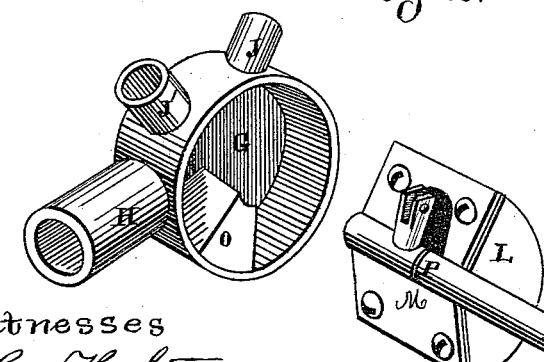

Referring to the accompanying drawings, Figure 1 is a perspective view of our invention. Fig. 2 is a perspective view of the valve and case. Fig. 3 is a vertical section. Fig. 4 is a horizontal section of valve. Fig. 5 is a horizontal section of cut-off slide.

Let A represent an ordinary water-closet bowl, and B the waste-pipe, which is straight, having no trap or curves of any kind. At the point where the bowl and waste-pipe join is a chamber, C, in which is placed a peculiarly-constructed valve, D, arranged so as to close across the waste-pipe, and when drawn back to leave an opening the whole size of the pipe. The chamber C extends out on one side of the waste-pipe, as shown, so as to allow the valve to move back in a horizontal plane clear of the opening in the pipe. On one corner of the extended portion of the chamber is a vertical pin or shaft, E, passing through and attached to the narrowest part of the valve, by which the valve is opened and closed, as hereinafter described. Under the valve and in the chamber are two inclined supports, F, so arranged that as the valve is closed it slides up on these inclines, so as to shut tight against the lower portion of the bowl and prevent any gases or odor from coming up out of the waste-pipe. The upper face of the valve-chamber has rubber washers around it, so that when the valve is in its seat a tight joint is made, while at the same time it is easily removed when desired.

The valve which we use for controlling the flow of water is of peculiar construction, and so arranged as to give a sudden flow of water, which throws first a sheet across the waste-pipe to prevent gases arising when the valve is open, and then washes into the bowl, the flow of water gradually decreasing as the valve slowly closes.

The valve-chamber G is circular in form, and has forming part of it a supply-pipe, H, and two discharge-pipes, as shown. The discharge-pipe J is connected by tubing or piping with the upper part of the bowl A, throwing the water in on one side of the bowl, so that it will take a rotary motion and wash the bowl out thoroughly. The other discharge-pipe, J', is connected by a piping with the chamber C immediately under the opening of the bowl and under the valve D, and at this point the water is spread out in a sheet, so as to flow across the upper end of the waste-pipe when the valve D is removed from its seat, and thus prevent the gases in the waste-pipe from rising. As soon as the valve D closes the sheet of water is stopped, as hereinafter described, so that no gas is allowed to escape from the waste-pipe into the bowl.

The valve-chamber G is placed so that the two discharge-pipes are on top, as shown, and the supply-pipe is connected with the water-pipes in the usual manner. In the center of the valve-chamber is mounted a horizontal stem or shaft, K, which projects through one side of said chamber, as shown, and has suitable connections, hereinafter described, for operating the rotary valve. One head of the valve-chamber is made solid, and the other is so arranged as to admit of the insertion of the valve and its removal for repairs when necessary. Attached to this shaft, so as to revolve with it, is the rotary valve L, which is made in a peculiar semi-cylindrical shape, as shown, the face being held closely against the cylindrical seat formed by the chamber by the position of the shaft.

On the flat portion of the rotary valve are plates M, which keep in place, by means of screws, the leather or rubber washers or packing, as shown. The upper flat face of the rotary valve has formed in it a recess, N, which is continued through the valve to the center of the circular face, and elongated, as shown, so that when the valve is turned wide open a passage is formed through the valve by this recess N communicating with the discharge-pipe J, allowing the water to pass out that way into the top of the bowl. This elongation of the recess is necessary in order to give a long flow of water, whereas, if it were only of the size of the discharge-pipe, the flow would be cut off sooner than desired. By this construction the water flows through the recess as the rotary valve is being turned longer than it would were the recess not elongated. As the shaft is rotated back this passage is closed by the upper opening in the circular part of the valve being thrown back from the opening of the discharge-pipe J. The water is then free to pass through the discharge-pipe J, previously closed by the solid part of the valve covering it; but as the rotary valve is thrown back to shut off the passage through the discharge-pipe J the valve leaves the opening into the discharge-pipe-pipe J' free, and the water flows through it.

In the lower part of the valve-chamber and at one side of the center is placed the diaphragm O, secured to the valve-chamber, and having its upper end concaved, so that the shaft K rests and revolves on it. This leaves a small chamber or space in the valve-chamber between the diaphragm O and the lower flat side of the rotary valve L, as shown.

On the shaft K is formed a small groove, P, so as to allow water to pass from the chamber behind the diaphragm slowly into that part of the valve-chamber G into which the supply-pipe is introduced, as hereinafter described.

On the shaft K is pivoted, by means of an arm, Q, and screw or pin, the stem R, extending out into the supply-pipe, as shown, and having on its end the primary inlet-valve, S, operated, as hereinafter described, by the rotation of the shaft K.

Attached to the outer portion of the valve-chamber G is a bell-crank lever, T, operated by the rod U, which has the usual handle at its upper end projecting through the seat, on which the bowl A is placed. A weight, A', on the lower end of this lever draws the handle down again. On the upper arm of this bell-crank lever T is pivoted a horizontal arm, V, loosely pivoted to one side of the pin or shaft E, as shown, so that as the rod U is raised the arm V is drawn back, thus rotating the shaft or pin E and swinging the flat valve D away from the lower portion of the bowl A into the extended portion of the chamber C.

On the shaft K outside the valve-chamber is a pin, W, which extends up through a slot in the end of the arm V, as shown. On the arm V is a lug, X, which engages with the pin W as the arm V is drawn back, and thus rotates the shaft K and operates the rotary valve and inlet-valve. On the end of the shaft K is a balance-rod, Y, having a weight, Z, on its outer end, for the purpose hereinafter described.

The operation of our device is as follows: When it is desired to empty the bowl A of its contents, after use, the handle on the upper end of the rod U is drawn up in the usual manner and released. As the handle is drawn up the bell-crank lever draws back the arm V, rotating the shaft E, and thus swings back the flat valve D into the extension of the chamber C, as herein described, thus leaving an opening from the bowl into the waste-pipe. This same action of raising the handle and drawing back the arm V pushes the lug X on said arm against the pin W, thus rotating back the shaft K and raising the weight Z on the end of the balance-rod Y up. This weight Z may be moved to or from the end of the balance-rod and secured in place, so as to lengthen or shorten the wash, as desired, by closing the valve more or less quickly. Now, as this shaft K is thus rotated back, the small slotted arm Q pushes back the stem R, and forces the inlet-valve S from its seat, thus admitting the water from the supply-pipe into the rotary valve-chamber C. The first water that enters passes out of the discharge-pipe J', and around under the bowl and swinging valve, being discharged across the opening in a thin flat stream, which prevents any gas from arising from the waste-pipe, and also washing the chamber clean. As the valve L is further rotated by the continued raising of the handle, this passage J' is closed by the solid part of the rotary valve coming past it. As this passage J' is closed, the recess N in the valve L comes opposite the opening of the discharge-pipe J, and the water flows through the recess in the valves and discharge-pipe J to the top of the bowl, thoroughly washing it out. During this operation the pressure of water on the chamber is such that a portion of it passes through the groove P on the shaft K, and gets behind the diaphragm O and between it and the rear lower flat portion of the rotary valve L.

As the handle is released the weight A' draws the bell-crank down suddenly, thus throwing the arm V forward again, operating the shaft E, and swinging the flat valve D back on its inclined supports in the chamber C, so that it closes the bottom of the bowl tightly. This sudden action of the bell-crank is not followed by as sudden a rotation of the shaft K, which moves more slowly in closing than opening, owing to the peculiar construction of its operating mechanism. While the shaft K is rotated back by the lug X pushing on the pin W, and has to move as rapidly as the bell-crank lever, when the handle is raised it does not have to move forward as quickly, since the pin W extends up through the slot in the end of the arm V, and the arm V can move forward without touching the pin or rotating the shaft K.

The return rotary motion of the shaft K is caused by the weight Z on the end of the balance-rod Y, which exerts a leverage to rotate said shaft. Now, as the space between the diaphragm O and the lower flat sides of the rotary valve L has been meantime filled with water through the small groove P in the shaft K, it is obvious that this water, being inclosed, must be removed before the valve L can notch back again, so as to draw the inlet-valve S to its seat and shut off the supply of water. The leverage exerted by the weight Z on the balance-rod Y is sufficient to drive this water by rotating the shaft K and sliding the rotary valve around; but the rotary valve must push the water before it out of the little groove P in the shaft K. This takes some little time to accomplish, so that the main inlet-valve S is drawn back to its seat slowly, as the rotary valve is slowly drawn back by the weight. During the time necessary to draw the inlet-valve back to its seat the water is flowing, in a gradually-decreasing volume, through the recess N and discharge-pipe J, into the top of the bowl, the opening into the pipe J growing gradually smaller by the rotation of the valve L as the supply of water diminishes by the drawing in of the inlet-valve S. Just as the opening or recess N in the valve S passes the discharge-pipe J, the discharge-pipe J' is opened by the action of the rotary valve, and a quantity of water is thrown into the waste-pipe under the valve D before the inlet-valve S is brought to its seat. By this means a direct connection is always maintained between the inlet-valve and the waste-pipe, and any leakage which may occur in any place will pass under the swinging plate into the waste-pipe, and not go into the bowl.

When the closet is not in use the discharge-pipe J' is always connected with the waste-pipe directly, and no overflow-pipe is necessary in the bowl, since, as the valve is closed, there is no connection with the pipe J, it being tightly closed. By this manner we provide a waste-pipe cut-off and valve which does away with the necessity of any trap or curve in the waste-pipe.

The flat valve in the bottom of the bowl is so constructed as to close the opening tightly, and water will always stand in the bowl. At the moment of removal of the flat valve in the bottom of the bowl the flat jet of water completely covers the hole and prevents any gas from escaping, while at the same time the full size of the waste-pipe is utilized for the purpose for which it is intended, the valve swinging clear away from it when the handle is raised.

By the peculiar construction of our valve for regulating the water-supply the stream is thrown in two directions, as described, one answering for preventing the escape of gases or odor when the waste-pipe is uncovered, and the other answering to wash out the bowl. Moreover, while the action of the mechanism is such as to cause a rapid movement of the valve between the waste-pipe and bowl, it is at the same time such as to admit of the washing-water entering the bowl for some time after the bowl-valve is closed, thus always keeping water in the bowl and closing the opening into the waste-pipe tightly.

In case the waste-pipe becomes stopped up or clogged at any time in ordinary water-closets it is a matter of considerable difficulty to clear it out. In this one all that is necessary is to raise up the balance-rod enough to open the inlet-valve and allow the full pressure of the water to flow through the discharge-pipe J' under the valve D into the waste-pipe, when the pressure of the water will force the pipe clear. By this action the bowl continues closed, and no gas or odor can arise, while the water may be allowed to flow as long as necessary through the waste-pipe.

Having thus described our invention, what we claim as new, and desire to secure by Letters Patent, is—

1. The valve or cut-off D, mounted upon the pin or shaft E, upon which it swings, and moving in the chamber C, so as to swing across the discharge-passage or be withdrawn from it, substantially as shown, and for the purpose herein described.

2. The valve L, forming the segment of a cylinder, and rotating upon the shaft K in the case G, said case having the two outlets J J' and the inlet-passage H and valve S, substantially as herein described.

3. The segmental rotating valve L, turning on its shaft K within the case or chamber G, said shaft having the arm Q and stem R, whereby the valve S and the valve L are opened and closed simultaneously, substantially as herein described.

4. The valve L, rotating on its shaft K, said valve having the passage N made through it, as shown, in combination with the case G, with its inlet and outlet passages H J J', and the diaphragm O, grooved at P, substantially as shown, and for the purpose herein described.

5. The bell-crank lever T, with its operating-rod U, arm V, lug X, and pin W, upon shaft K, and the balance-rod and weights, in combination with the swinging valve D and the valves L and S, substantially as herein described.

6. The bowl A and waste-pipe B, with its cut-off valve D, in combination with the nozzle J and the secondary jet-nozzle, J', said secondary nozzle discharging a sheet of water below the valve to prevent the escape of gas, and conveying away any leakage, so that no overflow-exit from the receiver is necessary, substantially as herein described.

7. The waste-pipe cut-off D, in combination with a double-outlet water-valve, L, and the discharge-jet J', whereby we are enabled to dispense with an overflow and provide for valve leakage, substantially as herein described.

In witness whereof we hereunto set our hands and seals.

ANSON LEVAKE. [L. S.]
SAMUEL N. GRUBB. [L. S.]

Witnesses:
 FRANK A. BROOKS,
 CHAS. G. YALE.